April 16, 1963  C. W. BEMMELS ET AL  3,085,903
ADHESIVE SHEET AND METHOD OF MAKING IT
Filed June 15, 1960
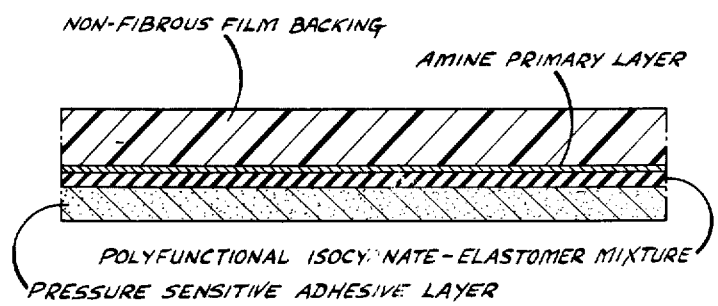
INVENTORS
CYRUS W. BEMMELS
RICHARD MYLES SMITH
BY
ATTORNEY

United States Patent Office 3,085,903
Patented Apr. 16, 1963

3,085,903
ADHESIVE SHEET AND METHOD OF MAKING IT
Cyrus W. Bemmels and Richard Myles Smith, New Brunswick, N.J., assignors to Johnson & Johnson, a corporation of New Jersey
Filed June 15, 1960, Ser. No. 36,145
5 Claims. (Cl. 117—76)

The present invention relates to pressure-sensitive adhesive sheets and tapes of the type comprising a relatively smooth flexible synthetic non-fibrous film backing and a rubbery hydrophobic pressure-sensitive adhesive coated on one side of the backing.

Heretofore, it has been recognized that there is a serious problem in bonding rubbery hydrophobic adhesive materials to backing films of this type, since there is little opportunity for the rubber to penetrate the relatively smooth non-porous surface of the backing and chemical affinity between the backing and the adhesive is quite low. Various types of primer materials have been applied in the form of a film or layer between the backing and the adhesive to bond the two together.

The above-described action of the primer layer is of particular importance in pressure-sensitive adhesive tapes of the type which is adapted to be wound upon itself in roll form to allow the tape to be unwound without offsetting or delamination of the adhesive from the tape. To accomplish this, it first is necessary that the cohesive strength of the adhesive layer be greater than the strength with which it adheres to the back of the tape backing on which it is wound. More importantly from the standpoint of this invention, it is necessary that the adhesive layer in the tape adhere to the backing via the primer layer more firmly than if the primer were omitted, as described above, with the result that when the tape is unwound the adhesive will remain adhered to the backing through the primer layer and will not delaminate or peel off onto the opposite side of the backing.

Most of the prior art primers have one serious disadvantage when used with moisture sensitive backings of cellulosic and other materials; i.e., they also are water sensitive and lose their effectiveness under conditions of high humidity. Primers based upon polyfunctional isocyanates-elastomer mixtures have been proposed to provide acceptable anchorage between adhesive and backing under moist conditions. However, they have the disadvantage that the primer layer must be cured for a definite period of time. While the time for curing this type of primer may be decreased somewhat by heating, heat treatment tends to embrittle and cause discoloration of the resulting sheet. Isocyanate primers of this type have broader application since they are suitable for bonding conventional pressure-sensitive adhesives to certain dense non-moisture-sensitive backing materials such as polyethylene terephthalate under both dry and moist conditions when conventional primers are ineffective. Again, a definite curing period is required.

It is an object of this invention to provide a pressure-sensitive adhesive sheet which comprises a flexible synthetic non-fibrous film backing and which possesses the greatest possible anchorage between the backing and the adhesive under dry and moist conditions.

Another object of the invention is to provide a pressure-sensitive adhesive tape or sheet based upon a cellulosic backing such as cellophane which possesses good anchorage at high humidities.

Still another object of the invention is to minimize or eliminate the time needed for curing the primer in the manufacture of pressure-sensitive adhesive tapes and sheets in accordance with the foregoing objects using a polyfunctional isocyanate-elastomer primer; and to provide a novel process for this purpose.

Other and further objects of the invention will be apparent from the following description and claims.

The present invention contemplates a novel pressure-sensitive adhesive tape or sheet which comprises a flexible synthetic non-fibrous film backing, a hydrophobic rubbery pressure-sensitive adhesive layer, and a novel primer layer between the backing and the pressure-sensitive adhesive layer bonding them together, as well as a novel method for producing it. The primer layer, itself, comprises a primary layer in contact with the backing and a secondary layer in contact with the pressure-sensitive adhesive. The primary layer consists essentially of a non-volatile water-soluble polyamine having at least two amine groups; and the secondary layer comprises an isocyanate reactive elastomer and a polyfunctional isocyanate represented by the formula $R(N=C=O)_x$, wherein $x$ is an integer of two or larger and R is a polyvalent organic radical selected from the group consisting of a substituted or unsubstituted aryl, alkyl or aralkyl hydrocarbon, and an isocyanate reactive elastomer.

In accordance with the novel process of this invention, the amine primary layer is applied to the backing and then the isocyanate-elastomer mixture is applied to the primary layer to form the secondary layer. A conventional hydrophobic pressure-sensitive adhesive is coated onto the secondary layer of the primer after it has been dried. It is possible by this method to obtain especially good anchorage between the backing and the adhesive layer due to the primer with a minimum of curing time for the primer layer. For instance, at 110° F. superior anchorage values in accordance with this invention may be attained after drying the secondary layer of the primer for only five minutes. By way of contrast, the same primer without the primary amine layer will require 1–3 hours of drying time to reach the same level of anchorage. If, with the materials employed, it is possible to go to a much higher temperature, say 150° C., good anchorage can be obtained almost instantaneously in accordance with the process of this invention. However, this invention obviates the need for such high temperatures, since at only slightly elevated temperatures in the order of 125°–150° F. excellent wet and dry anchorage may be obtained in short enough time to make 1-pass primer-coating practical on conventional coating machinery. It also is possible, according to the present invention, to dry the primer at room temperature for about 10–15 minutes and obtain good anchorage between the backing and the adhesive layer. This compares with about five hours or more for the same primer with the amine primary coating eliminated.

Preferably, the polyfunctional isocyanate and the elastomer are mixed in proportions ranging between about one part isocyanate to 99 parts elastomer and 20 parts isocyanate and 80 parts elastomer. Excellent results have been obtained when the weight of the primary layer is between about 0.0001 and 0.005 ounce per square yard and the weight of the secondary layer is between about 0.001 and 0.05 ounce per square yard. Normally, better results are obtained when the weight of the secondary layer is increased from 0.001 towards 0.05 ounce per square yard as the weight of the primary layer is increased from 0.0001 towards 0.005 ounce per square yard.

Backing materials suitable for pressure-sensitive adhesive tapes and sheets in accordance with this invention include relatively smooth non-porous cellulosic materials such as cellophane, cellulose acetate and the like, vinyl film made from polyvinyl chloride, copolymers of vinyl chloride and vinyl acetate and other polymers and copolymers of this type, polyethylene terephthalate, and various other flexible synthetic non-fibrous film materials. When water-sensitive cellulosic backings are used, pressure-sensitive tapes and sheets according to this invenntion are produced which have unusually high resistance to moisture and give good anchorage between the backing and the pressure-sensitive adhesive layer under very moist conditions. Sheets prepared from the same backings using primers which are moisture sensitive show little or no anchorage between the backing and the pressure-sensitive adhesive layer under the same moist conditions. If, on the other hand, the backing employed is a non-moisture-sensitive material such as polyethylene terephthalate, superior anchorage is obtained under both wet and dry conditions. Conventional primers which provide satisfactory dry anchorage for pressure-sensitive cellophane tapes, for example, do not normally provide this level of anchorage for materials such as polyethylene terephthalate.

Non-volatile water-soluble polyamines suitable for the first or primary coating of the primer layer in accordance with this invention include hexamethylene diamine, m-phenylene diamine, and tetraethylene pentamine. Normally these are applied in aqueous solutions containing a minor amount of the amine. The solution dries quickly even at room temperatures shortly after it is coated on the backing so that the secondary layer of the primer may be applied thereto without delay.

The polyfunctional isocyanate and the isocyanate reactive elastomer may be dissolved in a conventional aromatic solvent such as xylene or toluene which is inert with respect to the polyisocyanate for application to the primary layer. Polyisocyanates which may be used in accordance with this invention include P-P'-diisocyanato-diphenyl-methane (hereinafter sometimes referred to as MDI), toluene diisocyanate, chlorophenylene diisocyanate, hexane diisocyanate, anisidine diisocyanate, and dianisidine diisocyanate. Suitable isocyanate reactive elastomers include natural rubber, copolymers of butadiene and styrene, polybutadiene, copolymers of a diene and isobutylene, copolymers of butadiene and acrylonitrile and copolymers of lower alkyl acrylates such as butyl acrylate with acrylonitrile.

Any conventional pressure-sensitive adhesive can be used. Natural rubber and synthetic rubbers such as GRS latices and the like may be employed. Particularly good results are obtained when the same rubber is used in the pressure-sensitive adhesive layer as is employed as the elastomeric component of the secondary layer of the primer. However, this is not necessary.

In accordance with the invention, excellent dry anchorage and unusually good anchorage under very moist and wet conditions are attained. Dry anchorage is measured by making a special test sample and stripping it in a standard Thwing-Albert tensile tester as follows: The test sample is made by coating the backing with a primer layer of normal thickness and then applying a double thickness of the hydrophobic pressure-sensitive adhesive. While the adhesive still is wet, a woven fabric is pressed into the exposed side of the adhesive layer to such an extent that adherence between the fabric and the adhesive will be greater than the coherence of the adhesive layer itself. The resulting laminate then is dried and cut into test strips one inch wide. At the end of the sample the backing and the fabric are left accessible for gripping in the opposite jaws of the tensile tester. For measuring anchorage, the backing is placed in one jaw of the tensile tester, and the fabric at the same end of the test sample strip is placed in the other end of the tensile tester, and the jaws are separated at a rate of approximately 33 inches per minute. The tape extending below the end, which is the portion not yet stripped or pulled apart, is held up under the fabric portion of the end of the tape clamped in the testing jaw in a plane approximately parallel to the fabric. In other words, the fabric during stripping is folded back upon itself, whereas the backing is held out approximately straight. The average stripping force in ounces then becomes the dry anchorage value. Wet anchorage is measured in the same way as dry anchorage with the exception that the sample strip is soaked in water for one hour before testing. Using these techniques for measuring anchorage, any dry anchorage value over 40 ounces is considered satisfactory. On the other hand, any wet anchorage value over 1 ounce is considered quite satisfactory even though higher wet anchorage values are preferred. The great difference between the acceptable values for dry and wet anchorage reflects the measuring technique employed. Even though pressure-sensitive tape of this type would seldom, if ever, be immersed in water for an hour, it is felt that if the tape exhibits appreciable anchorage after immersion in water for this period of time it also will exhibit satisfactory anchorage of a much higher order under moisture conditions of the type which normally will be encountered in use.

The invention will be illustrated by way of the following examples:

Example I

The following primary and secondary coats are knife-coated onto the thin flexible cellophane backing sheet, the second coat immediately following the first without an intermediate drying step.

Primary coat: Grams
    Hexamethylene diamine _____ 1.0
    Water _____ 99.0
Secondary coat:
    Pale crepe (milled 25 passes) (25% rubber solids in toluene) _____ 24.8
    MDI (50% MDI in o-dichlorobenzene) _____ 0.2
    Toluene _____ 25.8

Following coating the primer is dried for about 5 minutes at approximately 110° F. The primed sheet then is coated with a crude rubber mass and tested for dry and wet anchorage as described above. A dry anchorage of 57.3 ounces and a wet anchorage of 2.0 ounces is attained. This is considered excellent for all moisture conditions.

Example II

The following primary and secondary primer coats are knife-coated on a polyethylene terephthalate (Mylar) film in accordance with the procedure of Example I, and the resulting sheet is coated with a pressure-sensitive adhesive mass comprising both crude rubber and GRS.

Primary coat: Grams
    Hexamethylene diamine _____ 1.0
    Water _____ 99.0
Secondary coat:
    Pale crepe (milled 25 passes) (25% rubber solids in toluene) _____ 48.0
    MDI (50% MDI in o-dichlorobenzene) _____ 0.48
    Toluene _____ 51.5

This sheet gives an exceptional dry anchorage of 122.1 ounces and a wet anchorage of 80 ounces when tested in accordance with the foregoing. Of course, the very high wet anchorage achieved is largely due to the fact that the Mylar backing is not moisture sensitive. However, anchorage values in this order cannot be attained with conventional primers for pressure-sensitive tapes and sheets.

Example III

Again, a Mylar backing film is coated in accordance with the procedure of Example I, this time with the following primer layers.

Primary coat: Grams
    Hexamethylene diamine _____ 5.0
    Water _____ 95.0
Secondary coat:
    88:12 butyl acrylate:acrylonitrile copolymer__ 10.8
    Butadiene:acrylonitrile copolymer _____ 1.2
    MDI (50% MDI in o-dichlorobenzene) _____ 2.4
    Toluene _____ 86.8

After drying the primed sheet is coated with a pressure-sensitive adhesive mass based on the same butyl acrylate acrylonitrile polymer. Again, especially high anchorage values, i.e., 90.6 ounces dry and 75.0 ounces wet are obtained.

*Example IV*

Cellophane is coated in accordance with the procedure of Example I with the following primer coats.

| Primary coat: | Grams |
|---|---|
| m-Phenylene diamine | 1.0 |
| Water | 99.0 |
| Secondary coat: | |
| Pale crepe (milled 25 passes) (25% rubber solids in toluene) | 24.8 |
| MDI (50% MDI in o-dichlorobenzene) | 0.2 |
| Toluene | 25.8 |

After coating with a crude rubber pressure-sensitive adhesive mass, a dry anchorage value of 46.1 ounces and a wet anchorage of 2.0 ounces is obtained when tested as described herein.

*Example V*

A flexible cellulose acetate film is coated in accordance with the procedure of Example I as follows.

| Primary coat: | Grams |
|---|---|
| Hexamethylene diamine | 1.0 |
| Water | 99.0 |
| Secondary coat: | |
| Pale crepe (milled 25 passes) (25% rubber solids in toluene) | 48.0 |
| MDI in o-dichlorobenzene) | 0.48 |
| Toluene | 51.5 |

Again, the dry primer is coated with a crude rubber mass and tested to give a dry anchorage of 43.4 ounces and a wet anchorage of 60 ounces. This dry anchorage is quite satisfactory, and the wet anchorage of 60 ounces is unusual.

The instant invention is further illustrated by the attached drawing which is a schematic view in section through a pressure-sensitive adhesive sheet according to this invention. The drawing illustrates a non-fibrous film backing coated with a primer layer which, in turn, comprises an amine primary layer and a secondary layer of a polyfunctional isocyanate-elastomer mixture applied to the backing as described hereinbefore. A pressure-sensitive adhesive layer is shown applied to the primer layer over the polyfunctional isocyanate-elastomer mixture.

Having now described the invention in specific detail and exemplified the manner in which it may be carried into practice, it will be readily apparent to those skilled in the art that innumerable variations, modifications, applications, and extensions of the basic principles involved may be made without departing from its spirit and scope.

The invention claimed is:

1. A pressure-sensitive adhesive sheet which comprises a flexible synthetic non-fibrous film backing, a layer of a hydrophobic rubbery pressure-sensitive adhesive, and a primer layer between said backing and said adhesive layer, said primer layer comprising a primary layer applied directly to the backing and consisting essentially of a non-volatile water-soluble polyamine with at least two amine groups selected from the group consisting of primary and secondary amines and a secondary layer between the primary layer and the pressure-sensitive adhesive layer and comprising a mixture of an isocyanate reactive elastomer and a polyfunctional isocyanate represented by the formula $R(N=C=)_x$ wherein $x$ is an integer of two or larger and R is a polyvalent organic radical selected from the group consisting of a substituted or unsubstituted aryl, alkyl or aralkyl hydrocarbon in proportions ranging between about one part isocyanate to 99 parts elastomer and 20 parts isocyanate to 80 parts elastomer, the weight of the primary layer being at least about 0.0001 ounce per square yard and the weight of the secondary layer being at least about 0.001 ounce per square yard.

2. A pressure-sensitive adhesive sheet which comprises a flexible synthetic non-fibrous film backing, a layer of a hydrophobic rubbery pressure-sensitive adhesive, and a primer layer between said backing and said adhesive layer, said primer layer comprising a primary layer applied directly to the backing and consisting essentially of a non-volatile water-soluble polyamine with at least two amine groups selected from the group consisting of primary and secondary amines and a secondary layer between the primary layer and the pressure-sensitive adhesive layer and comprising a mixture of an isocyanate reactive elastomer and a polyfunctional isocyanate represented by the formula $R(N=C=O)_x$ wherein $x$ is an integer of two or larger and R is a polyvalent organic radical selected from the group consisting of a substituted or unsubstituted aryl, alkyl or aralkyl hydrocarbon in proportions ranging between about one part isocyanate to 99 parts elastomer and 20 parts isocyanate to 80 parts elastomer, the weight of the primary layer being between about 0.0001 and 0.005 ounce per square yard and the weight of the secondary layer being between about 0.001 and 0.05 ounce per square yard.

3. A pressure-sensitive adhesive sheet which comprises a relatively smooth non-porous moisture sensitive film backing, a layer of a hydrophobic rubbery pressure-sensitive adhesive, and a primer layer between said backing and said adhesive layer, said primer layer comprising a primary layer applied directly to the backing and consisting essentially of a non-volatile water-soluble polyamine with at least two amine groups selected from the group consisting of primary and secondary amines and a secondary layer between the primary layer and the pressure-sensitive adhesive layer and comprising a mixture of an isocyanate reactive elastomer and a polyfunctional isocyanate represented by the formula $R(N=C=O)_x$ wherein $x$ is an integer of two or larger and R is a polyvalent organic radical selected from the group consisting of a substituted or unsubstituted aryl, alkyl or aralkyl hydrocarbon in proportions ranging between about one part isocyanate to 99 parts elastomer and 20 parts isocyanate and 80 parts elastomer, the weight of the primary layer being at least about 0.0001 ounce per square yard and the weight of the secondary layer being at least about 0.001 ounce per square yard.

4. The process of manufacturing a pressure-sensitive adhesive sheet which comprises coating one side of a flexible synthetic non-fibrous film backing with a non-volatile water-soluble polyamine having at least two amine groups selected from the group consisting of primary and secondary amines to form a thin primary layer of the amine on the backing, coating the primary layer with a mixture of an isocyanate reactive elastomer and a polyfunctional isocyanate conforming to the general formula $R(N=C=O)_x$ wherein $x$ is an integer of two or larger and R is a polyvalent organic radical selected from the group consisting of a substituted or unsubstituted aryl, alkyl or aralkyl hydrocarbon in proportions ranging between about one part isocyanate to 99 parts elastomer and 20 parts isocyanate and 80 parts elastomer, drying the mixture to provide a secondary layer of the isocyanate and elastomer, and coating the secondary layer with a pressure-sensitive adhesive.

5. The process of manufacturing a pressure-sensitive adhesive sheet which comprises coating one side of a flexible synthetic non-fibrous film backing with an aqueous solution of a non-volatile water-soluble polyamine having at least two amine groups selected from the group con- primary layer of the amine on the backing, coating the primary layer with a mixture of an isocyanate reactive elastomer and a polyfunctional isocyanate conforming to the general formula $R(N=C=O)_x$ wherein $x$ is an integer of two or larger and R is a polyvalent organic radical selected from the group consisting of a substituted or unsubstituted aryl, alkyl or aralkyl hydrocarbon in proportions ranging between about one part isocyanate to 99 parts elastomer and 20 parts isocyanate and 80 parts sisting of primary and secondary amines to form a thin elastomer in solution in an organic solvent, drying the mixture to provide a secondary layer of the isocyanate and elastomer, and coating the secondary layer with a pressure-sensitive adhesive.

References Cited in the file of this patent
UNITED STATES PATENTS 2,721,811     Dacey et al. _____ Oct. 25, 1955
2,886,467     Lavanchy et al. _____ May 12, 1959

UNITED STATES PATENT OFFICE

CERTIFICATE OF CORRECTION

Patent No. 3,085,903                          April 16, 1963

Cyrus W. Bemmels et al.

It is hereby certified that error appears in the above numbered patent requiring correction and that the said Letters Patent should read as corrected below.

Column 5, line 69, for "$R(N=C=)_x$" read -- $R(N=C=O)_x$ --; column 6, line 69, for "con-" read -- consisting of primary and secondary amines to form a thin --; column 7, line 5, strike out "sisting of primary and secondary amines to form a thin".

Signed and sealed this 31st day of March 1964.

(SEAL)
Attest:
ERNEST W. SWIDER

Attesting Officer

EDWARD J. BRENNER

Commissioner of Patents